July 25, 1950     E. SOKOLIK     2,516,431
BICYCLE ACCESSORY
Filed Aug. 15, 1946
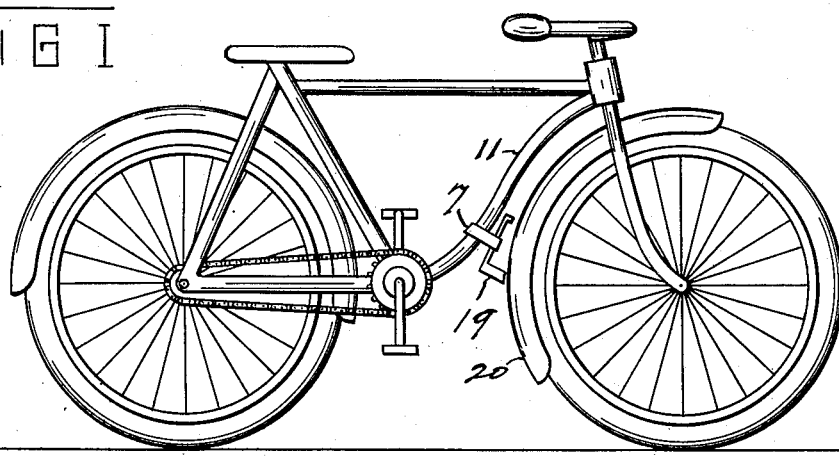
FIG 1
FIG 4
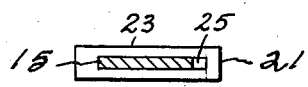
FIG 5
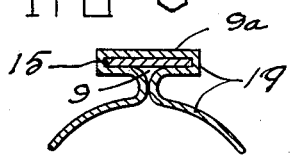
FIG 6
FIG 2     FIG 3
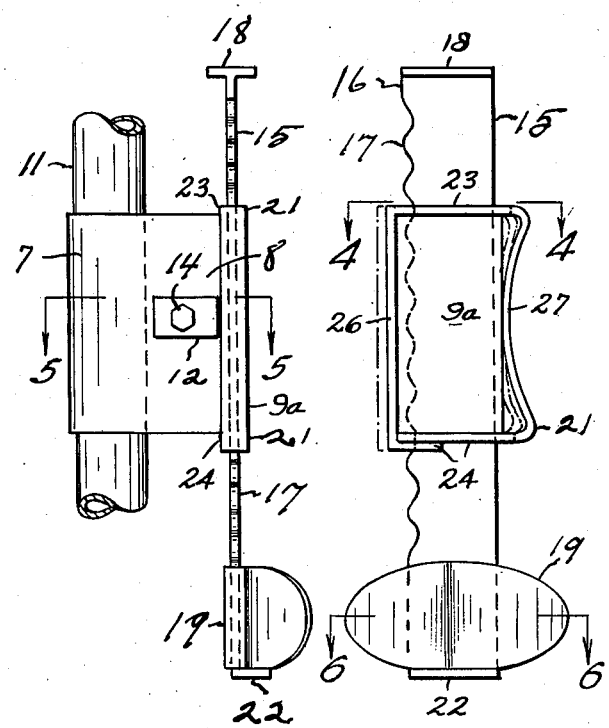
INVENTOR.
Edward Sokolik Patented July 25, 1950

2,516,431

UNITED STATES PATENT OFFICE 2,516,431

BICYCLE ACCESSORY

Edward Sokolik, New Brighton, Minn.

Application August 15, 1946, Serial No. 690,741

9 Claims. (Cl. 280—272)

My present invention relates to improvements in a yieldable holder or gripping means to stabilize bicycles during parking thereof.

The principal object is to provide a holder to prevent, during the parking of a bicycle, automatic swiveling of the steering wheel thereof to maintain equilibrium of the bicycle and consequently prevent tumbling of the bicycle.

An important object is to provide a holder adapted to be adjusted by raising or lowering thereof, upon the front oblique frame tube of the bicycle frame for effective cooperation with the fender of the steering wheel.

A further important object is to provide a holder that is associated with the front tubular oblique member of the frame and operative therefrom upon the fender of the steering wheel.

Another important object is to provide a holder that is adapted to adjustable gripping cooperation with the fender of the steering wheel.

Another object is to provide a holder that is very light and compact.

A still further object is to provide a holder which if not manually disengaged from the fender before the steering wheel is steerably swiveled, is automatically yieldingly released from the fender, thereby preventing damage to the fender or the holder.

Further objects and advantages of the invention will be apparent as the specification proceeds.

The invention resides in the structure, arrangement, combination and assembly of the component elements.

Like reference characters represent like parts in all the drawing views:

Figure 1 is a side elevation of a bicycle showing the holder mounted on the frame thereof.

Figure 2 is a side elevation of the holder.

Figure 3 is a front elevation of the holder.

Figure 4 is a view on line 4—4, Figure 3 showing the spring which yieldingly controls the adjustability of the slidably lowering or raising of the sliding rack.

Figure 5 is a cross-section of the holder on line 5—5, Figure 2.

Figure 6 is a cross-section on line 6—6, Figure 3 of the spring for yieldingly engaging the back of the fender, mounted on the bottom end-portion of the sliding rack.

One embodiment of the invention comprises a holder which includes a spring clamp 7 made of spring ribbon having a narrow elongated slot guideway 9a which is rectangular in cross-section and the slot guideway is provided with a rectangular guideway slot 9. A spring arm 8 formed integrally with the rear of the slot guideway is bent to form a loop with the end of the spring arm portion 10 loosely and yieldably abutting the rear of the housing. The arms 8 and 10 fit around the front oblique member 11 of the bicycle frame and the end of the arms 8 and 10 converging and meet at the center of the slot guideway. Each arm portion 8 and 10 is medially provided with a hole 13. The spring clamp 7 is slidably adjustable upon the front tubular oblique member 11 of the frame of the bicycle so that the assembled holder can operatively engage the front fender 20. A bolt 14 is inserted through holes 13 in arms 8 and 10 and bolt 14 is provided with a bevel washer 12 on the external side of each arm 8 and 10 of the clamp 7 and screwthreadably fastening the clamp 7 to the member 11.

Formed from a narrow ribbon of spring metal into a rectangular body portion is a spring pawl 21 which engages the top, bottom, front and rear sides of the housing 9a. The top 23 and bottom 24 of spring 21 have narrow rectangular slots 25 formed therein and a portion of these slots 25 register with the slot 9 in the slot guideway 9a. A portion of the slots 25 in the top and bottom of the spring 21 extends over the end of the slot 9 in slot guideway 9a. The side 26 of the rectangular duplex spring-pawl 21 is straight and prevents the top and bottom from spreading during the raising or lowering of a sliding rack through the guideway 9a, and the other side 27 is inwardly arcuate and is the part of the spring 21 that has the function of yielding.

Telescopically mounted through the slot 9 of the slot guideway 9a and the slots 25 in the top 23 and bottom 24 of the spring 21 is a sliding rack 15, which is preferably a bar of the same width and thickness as the slot 9 in the slot guideway 9a but narrower than the slots 25 in the top 23 and bottom 24 of the spring 21. That portion of the rack 15 that slides through the said slot 9 in the slot guideway or housing 9a and through the slots 25 of spring 21 has one edge as indicated at 16, formed of alternately bulging or receding teeth or waves 17 having rounded edges permitting adjustable setting of the rack 15 in the slot 9 of the housing 9a and slots 25 of the spring 21. The teeth 17 are so arranged on the bar 15 that the receding waves 17 slide against the edge of the slots 25 in the top 23 and bottom 24 at the same time, when the rack 15 is being shifted, thereby causing the top 23 and bottom 24 of spring-pawl 21 to be moved simultaneously and alternately laterally. Therefore the adjustment of the bar 15 up and down in the slotway 9a moves the spring-pawl 21 laterally to and fro. When the spring-pawl 21 is releasedly interlocked in the receding waves between the bulging waves 17, the rack 15 will remain in such adjusted position until a predetermined pressure is applied on the bar 15, thereby overcoming the yielding resistance of spring-pawl 21 permitting the bar 15 to be moved to a different setting or position in the slot guideway 9a.

The length of the sliding rack 15 provided at the lower end 22 thereof with a yielding gripping means 19 is adapted to interlockingly engage the lower portion of the fender 20 of the steering wheel when raised, and to release the fender when lowered. The top end-portion 18 of the bar 15 is adapted to be manually operated. The lower end-portion 22 is adapted to hold the yieldable gripping means 19. The means 19 is transversely concave to contour to the transversely convex back of the fender 20 when in gripping engagement therewith. The gripping engagement may be of predetermined intensity depending on the degree that the sliding rack 15 is raised or lowered. But whatever the degree of intensity of the gripping means upon the fender 20, if the grip is not manually released before the steering wheel is steerably swiveled, the yielding gripping means 19 will automatically yieldingly release the fender 20, thereby preventing damage to the holder 7 or the fender 20.

It is to be understood that various other modifications may be resorted to within the scope and concept of the invention without affecting the merits of the subjoined claims.

What I claim is:

1. The combination with the front oblique member of a bicycle frame, of a manually operable holder to grip the fender of the steering wheel of a bicycle during the parking thereof to prevent tumbling of the bicycle, comprising a clamp adjustable upon said front oblique member of the bicycle frame, said clamp having a housing provided with slot guide; means to secure the clamp to the frame; a yielding means associated with the housing; a manually operable alternatively sliding element adapted to slide in the slot guide in the housing under the yielding frictional pressure of said yielding means, said sliding element being provided with a yielding gripping means adapted to grip the front fender of a bicycle during the parking thereof to prevent the steering wheel from being automatically swiveled, thereby maintaining equilibrium of the bicycle and preventing tumbling of said bicycle, said yielding gripping means, if not manually disengaged from the fender by means of operating the sliding element before swiveling the steering wheel by manual steering of same, will automatically yieldingly release the front fender of the bicycle, thereby preventing damaging the fender or the holder by the manual steering thereof.

2. Claim 1 as defined in which the sliding element is operable by uprightly raising and lowering same, thereby gripping and releasing the back of the arcuate lower portion of the fender respectively.

3. The combination with the front oblique member of a bicycle frame, of a manually operable holder to grip the fender of the steering wheel of a bicycle during the parking thereof to prevent tumbling of the bicycle, comprising a clamp adjustable upon said front oblique member of the bicycle frame, said clamp having a housing provided with a slot guide; means to secure the clamp to the frame; a yielding means associated with the housing; a manually operable sliding element adapted to slide in the slot guide of the housing and adapted to be adjusted from one setting to another setting in the slot of the housing when a predetermined force is applied to said element, said sliding element yieldingly interlocking with the yielding means subject to yielding release when said predetermined force is applied to the sliding element, said sliding element being provided with a yieldable gripping means adapted to grip the fender of a bicycle during the parking thereof to prevent the steering gear from being automatically swiveled, thereby maintaining equilibrium of the bicycle and preventing tumbling of said bicycle.

4. Claim 3 as defined in which the sliding element is operable by uprightly raising or lowering same, thereby releasing and gripping the back of the arcuate lower portion of the fender respectively.

5. Claim 3 as defined in which the portion of the sliding element that cooperates with the yielding means, is provided with a series of waves alternating inwardly and outwardly and cooperating with the yielding means, thereby being alternately interlockable in the inwardly alternating waves.

6. The combination with the front oblique member of a bicycle frame, of a manually operable holder to grip the fender of the steering wheel of a bicycle during the parking thereof to prevent tumbling of the bicycle, comprising a clamp adjustable upon said front oblique member of the bicycle frame, said clamp having a housing with a slot guide associated therewith; means to secure the clamp to the frame; a yielding means associated with the housing, said yielding means having a top, a bottom and at least one side, which is yieldingly arcuate inwardly, said top and bottom having each a slot formed therein and superimposing the top and bottom of the slot guide in the housing, said slots in the spring registering with the slot in the housing, except in the direction of the yielding arcuate side of the yielding means, in which direction the slots in the top and bottom of the yielding means are extended to permit lateral alternating shifting of the top and bottom of the yielding means; a manually operable sliding element adapted to slide in the slot of the housing, and in the slots of the top and bottom of the yielding means, and adapted to be adjusted from one setting to another setting in the slots of the top and bottom of the yielding means and yieldingly interlocking in the slots of the top and bottom of the yielding means subject to yielding release when a predetermined manual force is applied to the sliding element, said sliding element being provided with a yielding gripping means adapted to grip the front fender of a bicycle during the parking thereof to prevent the steering gear from being automatically swiveled, thereby maintaining equilibrium of the bicycle and preventing tumbling of said bicycle, said yielding gripping means, if not manually disengaged from the fender by means of the alternatively sliding element before swiveling the steering wheel by manual steering of same, automatically yieldingly releasing the fender of the bicycle, thereby preventing damaging the fender or the holder by the manual steering thereof.

7. Claim 6 as defined in which the sliding element is operable by uprightly raising and lowering same, releasing and gripping the back of the arcuate lower portion of the fender respectively.

8. Claim 6 as defined in which the portion of the sliding element, that cooperates with the slots in the top and bottom of the yielding means, is provided with a series of waves alternating inwardly and outwardly and being spaced so that like waves cooperate with the slots in the top and bottom of the yielding means, thereby permitting uniform alternating lateral shifting of the top and bottom of the yielding means, into and out of the inwardly alternating waves, said sliding element being releasably interlockable in the inwardly alternating waves during to and fro movement thereof.

9. In a device of the class described, the combination with the front oblique member of a bicycle frame, of a manually operable holder comprising a clamp associated with the said oblique member of the frame, and provided with a slot guide; a yielding means associated with the slot guide; a manually operable sliding element adapted to slide in the slot guide and to cooperate with the yielding means; a yielding grip means associated with the sliding element, whereby said yielding grip means is moved against the back of the front fender to clutch same, and retracted from the fender to release same, said yielding grip means being adapted automatically, yieldingly to release said fender upon manually steering the steering gear, if said gripping means is not previously retracted, thereby preventing damage to the fender or to the holder.

EDWARD SOKOLIK.

REFERENCES CITED

The following references are of record in the file of this patent:

UNITED STATES PATENTS

| Number | Name | Date |
|---|---|---|
| 2,415,735 | Fastborg | Feb. 11, 1947 |